Sept. 23, 1969     F. G. JORDAN     3,468,599
APPARATUS FOR PRODUCING VISUAL COLOR EFFECTS
Filed May 31, 1966

Frank G. Jordan
INVENTOR by  Elmer L. Zwickel
PATENT ATTY.

United States Patent Office 3,468,599
Patented Sept. 23, 1969

3,468,599
APPARATUS FOR PRODUCING VISUAL
COLOR EFFECTS
Frank G. Jordan, 3943 Diversey Ave.,
Chicago, Ill. 60647
Filed May 31, 1966, Ser. No. 554,068
Int. Cl. G02b 25/00
U.S. Cl. 350—146      5 Claims

ABSTRACT OF THE DISCLOSURE

A toy device for viewing black and white television images having prisms therein and an associate sheet of pink fluorescent acetate which causes the viewed image to appear in sharp relief and in variegated colors.

This invention relates to improvements in viewing devices and is particularly concerned with the novel construction and assembly of a device useful for producing visual color effects upon viewing a black and white television image.

It is an object of the invention to provide such a viewing device.

Another object is to provide a viewing device of the character referred to with a filter screen or rectifier to enhance the whole image received in color by a viewer.

Another object is to provide a device of the character referred to with a frame carrying one or more optical devices or prisms having the purpose of transmitting, to the eye of the user, a color image when a black and white television image is viewed.

Another object is to provide a device of the character referred to which is not expensive to manufacture, simple to use and very efficient in its use.

The structure by means of which the above noted and other advantages and objects of the invention are attained will be described in the following specification, taken in conjunction with the accompanying drawings, showing a preferred illustrative embodiment of the invention, in which.

Figure 1:
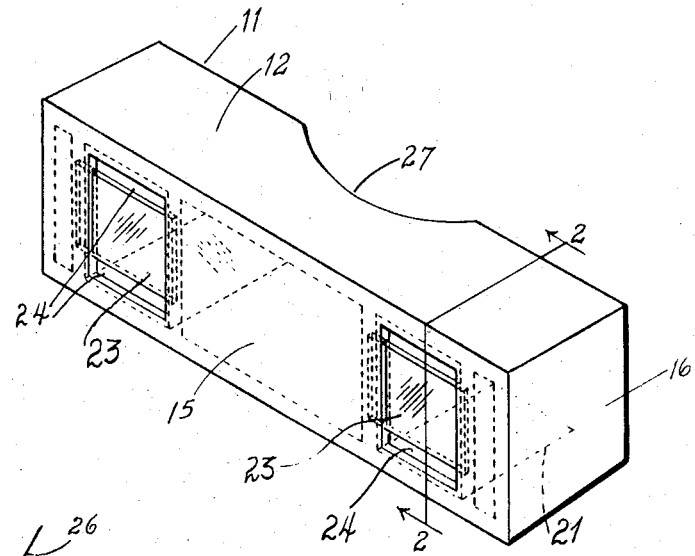
FIG. 1 is a perspective view of the device.

Referring to the exemplary disclosure of the viewing device shown in the accompanying drawings, the device includes a hollow frame or housing 11, that is substantially rectangular and includes a top wall 12, a back wall 13, a bottom wall 14, a front wall 15 and end walls 16. The front and back walls are each formed with aligned pairs of substantially square openings 17 and 18 respectively, although it should be understood that these openings can be of other practical shapes, such as round or rectangular. For the purposes of description the openings 17 shall be termed the image viewing openings and the openings 18 shall be termed the image receiving openings.

Figure 2:
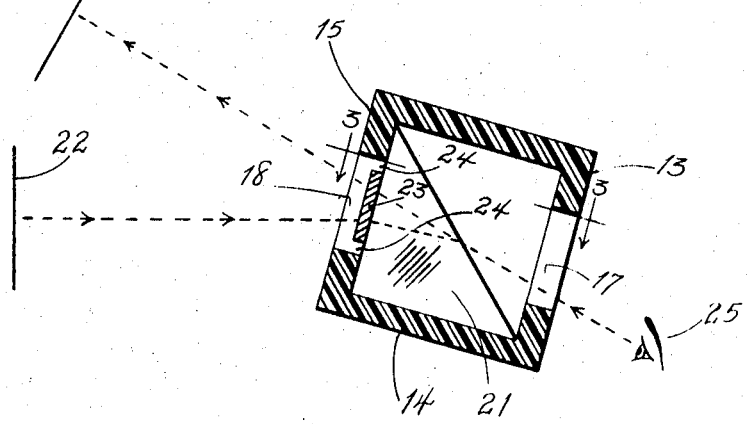
FIG. 2 is a vertical transverse sectional view of the device showing it in position of normal use in association with a television screen, taken substantially on line 2—2 of FIG. 1, and showing the prisms in elevation.
Figure 3:
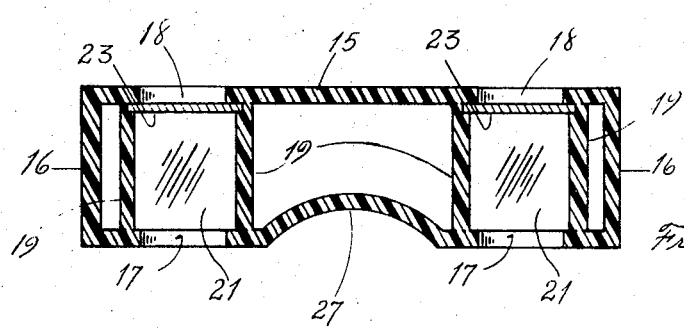
FIG. 3 is a horizontal sectional view of the device, taken substantially on line 3—3 of FIG. 2.

The space between the related pairs of openings 17–18 preferably is bridged by interior walls or webs 19 that define confined channels between them and in each of which is seated a right-angle triangle prism 21. Preferably, because of the weight factor, the prisms are fabricated from clear plastic although clear glass may be used. As best shown in FIG. 2, one right-angle triangle prism face is seated on bottom wall 14 whereas the other right angle image receiving face of such prisms is disposed toward front wall 15 with its hypotenuse facing the image transmitting opening 17 and extending from the upper terminus of back wall 15 to the lower terminus of front wall 13.

In use, the device is held before the user's eyes with the nose recess 27 facing the user, while viewing a black and white television image on screen 22. Viewed through the prisms of the device, the television image attains a multitude of colors much like that of a color television image.

In order to more effectively obtain a transition of color from the black and white image appearing on a cathode ray tube or television receiver tube screen 22, there is arranged over the face of the prism opposed to receiving opening 18, a thin sheet 23 of pink fluorescent acetate. The sheet may be mounted in any practical manner such as by being guided in vertical grooves in the walls 19 rearwardly of opening 18. This sheet has a thickness on the order of about .0200 inch and, as best shown in FIG. 2, its upper and lower edges terminate short of the upper and lower edges respectively of opening 18 so as to leave clear slot-like spaces 24. As an alternative, small holes may be randomly provided in sheet 23 in lieu of the slot-like spaces.

The small thin acetate sheets 23 arranged over the face of the prism openings may be of any suitable manufacture. However, sheets commercially known in the trade as "Lumith #E050053" pink fluorescent acetate produce very satisfactory results. In effect, such sheets bathe the whole picture image in a soft rose color, and more important, the pink fluorescent acetate sheets rectify the aberrations and distortion of details in the final image 26 when viewed through the device from about point 25 (FIG. 2), thus rendering the picture image more clear and in truer focus. While the colors blue and yellow predominate, all the colors will be seen, and the presence of the slot-like spaces 24 allows for greens and reds generated in the prism to come through to the eye of the viewer, thus multiplying the general over-all color effect.

Therefore, when a black and white television image is viewed through the device, such image will appear in multicolor giving substantially the effect of viewing color television. Of course, the color spectrum will not be true colors of a color transmitted image but there will be sufficient color and sufficient variety of colors to render the image viewed very pleasing and strangely fascinating.

I claim:

1. Apparatus for converting a black and white television image viewed by an observer into a multi-color image, said apparatus comprising, a housing having a front image receiving opening and a rear image transmitting opening, a right angle triangular prism arranged in said housing between and in register with said openings, with one of its right angle walls disposed toward the front opening, and a colored transparency overlying the said wall of the prism.

2. The apparatus recited in claim 1, in which the colored transparency is a pink fluorescent sheet.

3

3. The apparatus recited in claim 1, in which the housing includes means to retain the transparency in place.

4. The apparatus recited in claim 1, in which the upper and lower edges of the transparency terminate short of the related edges of the related opening.

5. The apparatus recited in claim 1, in which the transparency has openings therein.

References Cited

UNITED STATES PATENTS

| | | | |
|---|---|---|---|
| 2,594,698 | 4/1952 | Thomas | 350—287 X |
| 2,618,199 | 11/1952 | Evans | 350—145 |
| 3,039,351 | 6/1962 | Spagna et al. | 350—146 |
| 1,371,970 | 3/1921 | Furman | 350—173 |
| 1,661,611 | 3/1928 | Hamburger et al. | 350—173 |
| 1,843,007 | 1/1932 | Troland | 350—173 |

4

FOREIGN PATENTS

| | | |
|---|---|---|
| 629,098 | 10/1961 | Canada. |
| 695,001 | 1953 | Great Britain. |

OTHER REFERENCES

"Filters Aid Television," Radio-Craft for January 1948, Dr. Thomas T. Goldsmith, Jr.

DAVID SCHONBERG, Primary Examiner

P. A. SACHER, Assistant Examiner

U.S. Cl. X.R.

178—7.86; 350—133, 143, 168, 286, 287